US006775606B1

(12) United States Patent
Ertl et al.

(10) Patent No.: US 6,775,606 B1
(45) Date of Patent: Aug. 10, 2004

(54) DEVICE AND METHOD FOR SENSING AN OBJECT AND USE OF THE DEVICE AND METHOD FOR ADJUSTING AN ELEMENT

(75) Inventors: Ludwig Ertl, Regensburg (DE); Thorsten Köhler, Deuerling (DE); Stephan Voltz, Happurg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/445,060

(22) Filed: May 27, 2003

Related U.S. Application Data

(63) Continuation of application No. PCT/DE01/04584, filed on Dec. 6, 2001.

(30) Foreign Application Priority Data

Dec. 7, 2000 (DE) ........................................ 100 60 914

(51) Int. Cl.[7] ................................................ G05D 1/00
(52) U.S. Cl. ...................................... 701/49; 340/426.2
(58) Field of Search ................ 701/49, 45; 340/426.26, 340/457; 348/148, 143, 169; 180/273; 280/735; 318/467

(56) References Cited

U.S. PATENT DOCUMENTS

| 4,625,329 | A |   | 11/1986 | Ishikawa et al. ............. 382/104 |
| 4,995,091 | A | * | 2/1991  | Shimbara ...................... 382/272 |
| 5,988,676 | A |   | 11/1999 | Lotito et al. ................. 280/735 |
| 6,049,747 | A |   | 4/2000  | Nakajima et al. ............. 701/45 |
| 6,313,739 | B1 | * | 11/2001 | Roth et al. ............. 340/426.26 |

OTHER PUBLICATIONS

4th International Symposium and Exhibition on Sophisticated Car Occupant Safety Systems, Karlsruhe, Germany, Nov. 30–Dec. 2, 1998.

* cited by examiner

Primary Examiner—Marthe Y. Marc-Coleman
(74) Attorney, Agent, or Firm—Morrison & Foerster LLP

(57) ABSTRACT

In the interior of a vehicle markings (10, 13) are positioned on vehicle elements (2, 8, 7, 19) that are detected by a stereo camera (1). Said markings are configured as reflectors or as light emitters. The stereo camera (1) detects brightness differences between the respective marking and the immediate surroundings of the marking and detects the position of the marking. An evaluation unit (110) mounted downstream of the stereo camera (1) calculates the surface structure of the respective vehicle element on the basis of the predetermined dimensions of the vehicle elements.

30 Claims, 3 Drawing Sheets

DEVICE AND METHOD FOR SENSING AN OBJECT AND USE OF THE DEVICE AND METHOD FOR ADJUSTING AN ELEMENT

CLAIM FOR PRIORITY

This application is a continuation application of International Application No. PCT/DE01/04584, filed Dec. 6, 2001, which was published in the German language on Jun. 13, 2002, which claims the benefit of priority to German Application No. DE 100 60 914.7, filed in the German language on Dec. 7, 2000.

TECHNICAL FIELD OF THE INVENTION

The invention relates to an device and method for sensing an object in a vehicle, particularly for occupant detection, and the use of the device and method for adjusting an element.

BACKGROUND OF THE INVENTION

From the "4th International Symposium and Exhibition on Sophisticated Car Occupant Safety Systems" of the Fraunhofer Institute for Chemical Technology there is known an occupant detection system wherein occupancy of a vehicle seat is detected using infrared optical technology, light spots being projected by an LED array via an optical system onto the seat area to be detected. Each of these light spots is in turn imaged onto a CCD array by means of a receiver lens. Different positions of the peaks on the CCD array are produced depending on the distance of the light spot. The distance is determined from the fixed geometry of the image sensor and the maximum position using a triangulation process, so that the interpolation points of a contour can be calculated in this way using a plurality of LEDs.

The disadvantage of a system of this kind is that the shape of an object on the vehicle seat, e.g. an occupant or child seat, can only be obtained with low resolution.

SUMMARY OF THE INVENTION

The invention performs position sensing of elements or objects in a vehicle.

On elements of the vehicle, e.g. on a vehicle seat, there is provided an optical marking. In a vehicle there is provided a camera which detects the marking(s). An evaluation unit is connected downstream of the camera and determines the positions of the markings.

The camera records spatial information of the image area to be captured, the camera possibly being implemented as a stereo camera (3D camera) with two image sensors whose optical axes have a predefined spacing.

A suitable camera is, for example, a 3D camera which supplies the contour of an object on a vehicle seat by means of a range image. The volume distribution of the object on the seat can be extracted from the contour of the object by subtracting the contour of the seat surface. This constitutes a very robust method for classifying the object into child seats and persons of different weight categories. For a method of this kind it is important to measure and store the surface (contour) of the unoccupied vehicle seat, so that the information is then available for determining the range image of the vehicle seat in the occupied state. However, the seats are mainly re-adjusted after being occupied by a person. From the position of the marking, e.g. on the vehicle seat, the evaluation unit can calculate the surface shape of the unoccupied element on the basis of the pre-defined dimensions of the relevant elements in the vehicle, e.g. the contour of the surface of the vehicle seat. Advantageously, this means that the surface shape of the vehicle seat is known, which advantageously provides easier and more reliable detection of an occupant or of a child seat using image processing algorithms.

Another element could conceivably be a child seat, a head restraint or a rear-view mirror.

Moreover, the evaluation unit can determine the position of the element from the position of the markings. The element can be moveable or fixed relative to the vehicle.

The markings can have a predefined geometrical shape in each case, e.g. punctual, lineal and/or area1. Thus, for example, a marking can have a characteristic shape and consist of a group of punctual, lineal or area1 markings.

A marking can be implemented as a reflector, e.g. a flat mirror, as a triple mirror which reflects the incident light by precisely 180° relative to the light source, or as a spherical mirror which distributes the light from a light source over a predefined solid angle according to its curvature. A diffuse reflector with a high reflection factor is also conceivable.

In another embodiment, one of the markings is implemented as an opto-transmitter whose light is directly incident on the camera. The opto-transmitter can emit light in a predefined signal sequence by means of which each of the markings implemented as an opto-transmitter can be individually encoded.

The camera is preferably disposed on the lining of the vehicle roof. The brightness of the light reflected or transmitted by the marking is greater than that of the light reflected by the element in the immediate vicinity of the marking. This means that the camera can unambiguously sense the corresponding marking and determine its spatial position by means of gray-scaling and using image analysis processes running in the evaluation unit connected to the camera. If the marking is covered, no light from the marking is incident on the camera. This can additionally be analyzed and e.g. provide indications of seat occupancy, a child seat on the seat or a seat cover.

The light reflected or emitted by the corresponding marking is preferably at least twice as bright as the light reflected by the elements.

Using the above-mentioned device or method, the position of a rear-view mirror, vehicle seat or child seat, for example, can be detected. Detection of the position of the markings will support image processing methods for occupant detection, as the precise position of the vehicle seat, child seat or similar is therefore known. In addition, suitable image processing systems can now reliably ascertain the position of a vehicle occupant and discriminate e.g. between the vehicle seat and the body of the occupant. Classification of the occupancy state of the vehicle seat is therefore possible, which means that an airbag or a seat-belt restraint system can be deployed fully, partially or not at all according to the type of seat occupancy.

In addition, the position of the rear-view mirror and head restraint can be adjusted as a function of the determined position of the occupant, particularly the latter's head position.

By extrapolation of the backrest onto the vehicle floor, the displacement and position of the entire seat can be ascertained relative to the vehicle floor.

In order to differentiate between the optically visible markings and light reflexes, the markings can be encoded either spatially, i.e. by a pattern, or on a time basis, i.e. by a characteristic signal correlated with the image rate. (n. o.)

As well as the range image, the camera also supplies a gray-scale image of the image area to be captured in the vehicle. An (x, y, z) position in the range image with a gray-scale image is assigned in each case, via a calculation method (algorithm) for determining a range image, to a position (x, y) of a respective image sensor using the gray-scale image assigned to the position. A position in the gray-scale image can therefore be assigned to a point on the contour of a element in the vehicle interior or to a marking.

Moveable markings can additionally be placed in relation to non-moveable markings, which means that the positions of the moveable markings can be detected faster and more reliably. Moveable elements are e.g. a sliding vehicle seat with head restraint and child seat or a rear-view mirror. Non-moveable elements in the vehicle are e.g. a dashboard, the windshield or the door trim panels.

Covering of airbags, e.g. front airbags and side airbags, can be detected by the optical markings being covered for a prolonged period of time. An appropriate warning that an airbag has been covered e.g. by a bag or a seat cover, can be issued to the driver. If markings important for the safety of the occupant are covered for a prolonged period, a visual or audible warning is issued to the driver.

The advantage of having markings on a vehicle seat is that it avoids disposing safety-relevant functions in the vehicle seat itself, e.g. position sensors for ascertaining the position of the vehicle seat, resulting in a simplification of the safety concept. A simple and reliable means, not hitherto achieved, of measuring the position of the seat back for inclination and position is likewise made possible without using additional sensors.

The system for determining the position of a vehicle seat can additionally be used as a position transducer for a person-related seat memory system, thereby obviating the need for a position transducer, external memory or external controller. Having optical markings on the surface of the seat and seat back can enhance safety by making it possible to verify whether the seat is empty or occupied. With the markings implemented time-coded as opto-transmitters, the robustness of the image recognition method can be advantageously increased if the markings are briefly or partially covered.

In addition, markings can be disposed on the seatbelt in order to determine the rolled-out belt length and to detect whether the belt has been put on.

With electrical window lifters, there is a risk of trapping an object, e.g. the head, neck, or parts of the arms of an occupant when the window is closed. An imaging method can be used to detect the upper edge of the window glass in the vehicle door. By providing a marking in the window glass, on the inner side of the window glass, on its upper edge or in its lower region, the position or the current height of the window glass can be determined. The above-mentioned imaging method allows an object to be detected between the upper edge of the window glass and the upper part of the window frame. In addition, determining a break between a marking or part of a marking in the case of areal markings indicates an object in the vicinity of the top edge of the window glasses (danger area). A marking can be incorporated in the window glass. Automatic closing of the window using an electric motor is controlled as a function of the detected position of the object and of the window height position, trapping of the object being preferably prevented by stopping or slowing down closure.

BRIEF DESCRIPTION OF THE DRAWINGS

Preferred embodiments and developments of the invention are detailed in the dependent claims.

The invention will be explained in further detail with reference to the drawings.

DETAILED DESCRIPTION OF THE INVENTION

Figure 1:
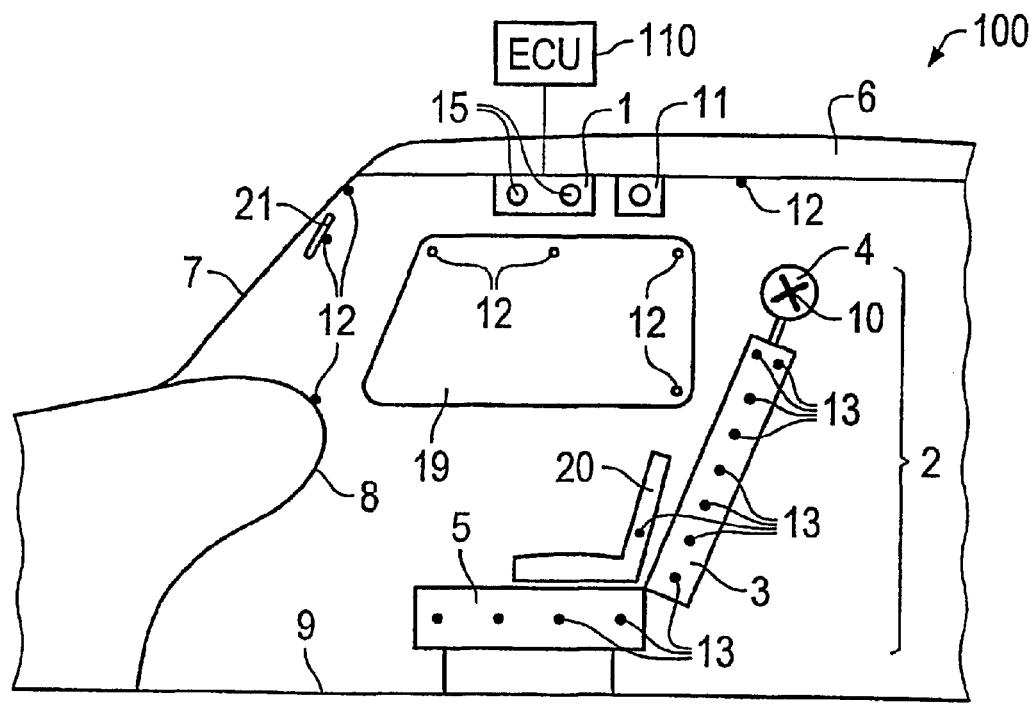
FIG. 1 shows the side view of a system for sensing objects in a vehicle.

Elements having the same function in FIGS. 1 to 5 have been provided with the same reference characters in the following.

FIG. 1 schematically illustrates part of the interior of a vehicle 100. The vehicle 100 has a vehicle floor 9 on which a vehicle seat 2 is mounted. In front of the vehicle seat 2 in the direction of travel there is disposed a dashboard 8 above which a windshield 7 extends to the roof 6 of the vehicle 100. In the lining of the roof 6 there is mounted a camera 1 which captures part of the interior of the vehicle, hereinafter defined as the image area. A light source 11 illuminates the image area to be captured. The image area in this case includes the area basically comprising the dashboard 8, the vehicle floor 9, the vehicle seat 2 and the vehicle door. In another embodiment there is provided a plurality of cameras 1 for capturing a plurality of image areas in the vehicle interior, e.g. for detecting the area of the driver's seat and of the passenger seat 2, the light source 11 being able to illuminate both vehicle areas simultaneously or separately. An evaluation unit 110 is connected downstream of the camera 1 and analyses the images captured by the camera 1.

The vehicle seat has seat base 5 on which a child seat 20 or an occupant (not shown) is placed or seated. A seat back 3 extends from the rear part of the seat base 13 in the direction of the vehicle roof 6. On the upper part of the seat back 3 there is disposed a head restraint 4. The vehicle seat 2 can be adjusted in the direction of travel either manually or using built-in electric motors. The inclination angle of the seat back 3 is likewise manually or automatically adjustable. The head restraint 4 is likewise manually or automatically adjustable in height. A rear-view mirror is disposed in the front area and is manually or automatically adjustable. The rear-view mirror 21 is exemplary for an internal rear-view mirror or an external rear-view mirror.

Optical markings 12 are provided on the dashboard 8, on the rear-view mirror 21, at the transition between the roof 6 and the windshield 7, on the lining of the vehicle roof 6 in the vicinity of the head restraint 4 and on the adjustable window glass 19. Further optical markings 13 are provided on the side of the seat back 3, head restraint 4, seat base 5 and child seat 20.

Figure 2:
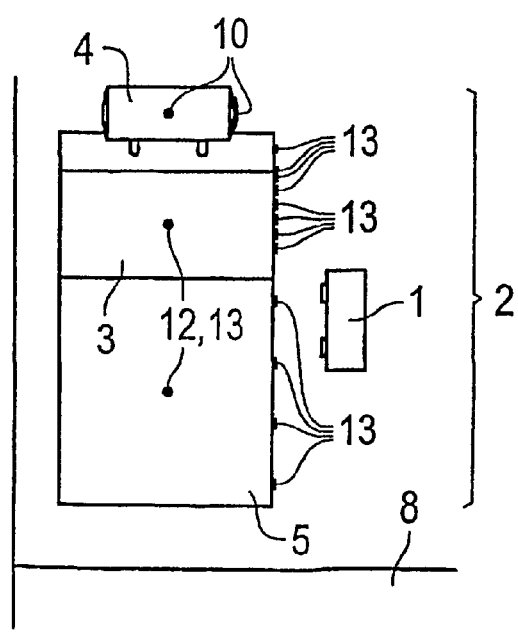
FIG. 2 shows the plan view of system according to FIG. 1.

The position of the markings 10, 13 on the vehicle seat are shown in detail in FIG. 2. FIG. 2 is a top view of the interior of the vehicle 100 as shown in FIG. 1. The camera 1 is in this case disposed on the lining of the vehicle roof 6 between the passenger seat and the driver seat (not shown). Markings 13 are disposed on the side of the seat back 3 and of the seat base 5.

Further markings 12, 13 are disposed on the seat base 5 and the surface of the seat back 3. Further markings are disposed on the side of the head restraint 4 and on its potential contact surface with the occupant's head. In further embodiments, the markings 10, 12, 13 can be implemented as reflectors 12, 13 and/or as opto-transmitters 13. The camera 1 is implemented as a 3D camera which supplies a range image and a gray-scale image of the image area to be recorded to the following evaluation unit 110 (FIG. 1) for further analysis. By means of a range image, the camera 1 supplies the contour of the object on the vehicle seat 2. From the contour of the object, the volume distribution of the object on the seat can be determined by subtracting the contour of the seat surface. This means that the object can be classified e.g. into child seat and persons of different weight categories. The evaluation unit 110 determines the corresponding range image using image processing algorithms.

The imaging system according to FIGS. 1 and 2 operates as follows:

The light source 11 illuminates the image area to be captured. The camera 1 records the light rays reflected by the image area to be captured and stores the gray-scale information of the image to be detected pixel by pixel and transfers it to the evaluation unit 110. The markings 10, 13 implemented as reflectors reflect the light emitted by the light source 11 particularly well, so that the markings 13, 12 are detected by the camera as points, lines or areas of light that are bright in comparison to the rest of the image. The evaluation unit 110 now recognizes from the image information with very bright gray-scale values that a marking 12, 13 is present at that location. The spatial position of the markings 12, 13 is determined using image analysis algorithms and the 3D camera 1. In comparison to the immediate vicinity of a marking 12, 13, the latter stands out by being particularly bright and is thus easily detectable. The predefined dimensions of the vehicle seat 2 and of the head restraint 4 enable the evaluation unit 110 to determine its surface shape from the position of the markings 10, 12, 13. Because of the now known surface information, reliable detection of objects located on the vehicle seat, e.g. an occupant or a child seat 20, is now possible. If the child seat 20 additionally has markings, the position of the child seat can also be simply and reliably determined by means of the ascertained position of the marking 13 on the side of the child seat 20.

Reliable recognition of the type of objects on the vehicle seat 2 is preferably assisted by the markings 12, 13 on the seat base 5 and on the backrest surface of the vehicle seat 2. This makes it possible to detect whether a child seat 20, an occupant or e.g. a cover or a mat is disposed on the vehicle seat 2.

On the side of the head restraint 4 there is provided an additional marking 10 which is implemented e.g. as an opto-transmitter. The light from said opto-transmitter 10 is incident on the camera 1 which detects the large difference in brightness between the opto-transmitter 13 and the area immediately around the opto-transmitter 13. The position of the opto-transmitter 13 is determined as described above. Because of the preferred position of the camera between the two front seats (1), the markings 13, 10 are disposed on the side of the seat base so that there is direct visual contact between the camera 1 and the markings 12, 13. The breaking of visual contact between the camera 1 and one of the markings 12, 13 is detected by the camera 1 and analyzed by the evaluation unit 110.

FIG. 3 shows various embodiments of the markings provided on the vehicle seat 2 as illustrated in FIGS. 1 and 2.

Figure 3A:
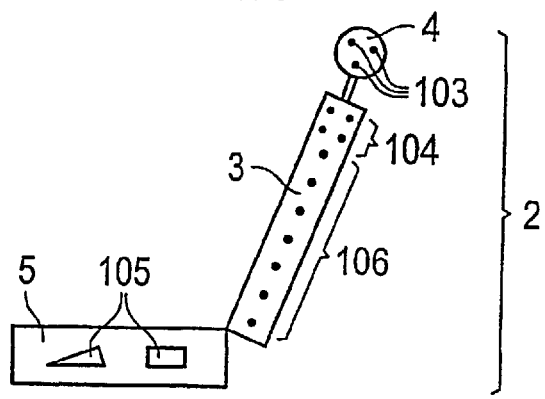
FIGS. 3a, 3b show the side view of a vehicle seat with various markings.

In FIG. 3*a*, markings 104, 106 implemented e.g. as reflectors or opto-transmitters are disposed on the side of the backrest 3 of the vehicle seat 2 in predefined geometrical shapes. For example, the head restraint 4 has three punctual markings 103 basically forming an isosceles triangle. The upper part of the backrest has punctual markings 104 on its side, forming the corners of a square. In addition, the backrest 3 has a group of seven punctual markings disposed along a line. On the side of the seat base 5 there are disposed areal markings 105 including e.g. of a reflection foil or an electroluminescence foil. The two markings 105 shown are triangular and rectangular in shape.

Figure 3B:
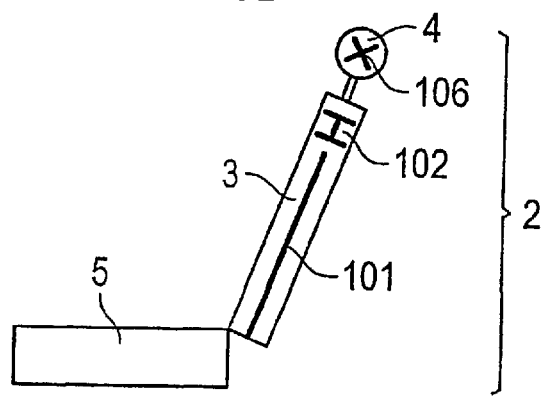

In FIG. 3*b*, further markings 101, 102, 106 are disposed on the side of the backrest 3 and of the head restraint 4. The reflecting marking 101 is basically implemented as a straight line. The marking 102 on the side of the backrest 3 is in the shape of the letter "H". The marking 106 on the side of the head restraint 4 has the shape of a large "X".

The various predefined shapes illustrated by way of example in FIGS. 3*a* and 3*b* are sensed by the camera and analyzed by the evaluation unit 110. From the brightness information and shape of the relevant marking, the imaging software in the evaluation unit detects its position. This means that position detection can be reliably implemented. Each geometrical shape is assigned a predefined position on the vehicle seat 2. In further embodiments any geometrical patterns and shapes could be used.

The markings which are implemented as reflectors reflect the light in various ways: with triple reflectors, the light emitted by the light source 11 is basically reflected through 180 degrees and sent back to the light source 11 and to the camera 1 disposed in its vicinity, the light source 11 and camera 1 being disposed close together, preferably in a housing. In a further embodiment, the reflectors are implemented in such a way that the light arriving from the ambient lighting or from the light source 11 is reflected in different directions, e.g. scattered.

If the markings are implemented as an opto-transmitter 13, e.g. as an LED or laser diode, it is additionally possible to encode the position of the markings not only geometrically by also by emission of a specified light sequence characterizing each opto-transmitter 13. A light sequence of this kind is shown in FIG. 4.

The light signals S from the opto-transmitter 13 are turned on and off in a predefined sequence, the ON and OFF times of the opto-transmitter 13 being synchronized with the image capture time for capturing an image with the camera 1.

Figure 4:
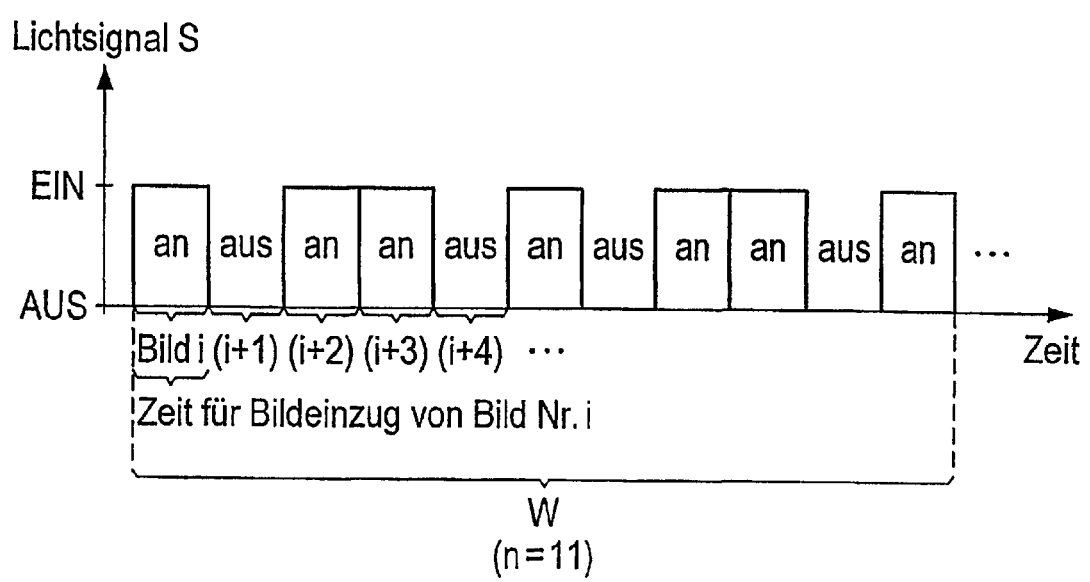
FIG. 4 shows a signal sequence over time of a marking implemented as an opto-transmitter.

In FIG. 4, an image i is acquired during the time i (capture of image no. i). The opto-transmitter 13 is preferably ON during the time i, and in another embodiment can even be ON for only part of the time. In the subsequent time i+1 for acquiring the image i+1, the opto-transmitter 13 is OFF. The further signal sequence of the opto-transmitter 13 during the times i+2, i+3, . . . is:

ON-ON-OFF-ON-OFF-ON-ON-OFF-ON

By combining n images of duration i, here n=11, a word W of length 11 is formed. This word W can be recognized by the evaluation unit 110 on the basis of the different items of brightness information from the opto-transmitter 13 at different imaging times i+x, which means that the opto-transmitter 13 is unambiguously encoded on the basis of the gray-scale information and is recognized by the evaluation unit 110. An unambiguous signature can therefore be assigned to each opto-transmitter 13.

Figure 5:
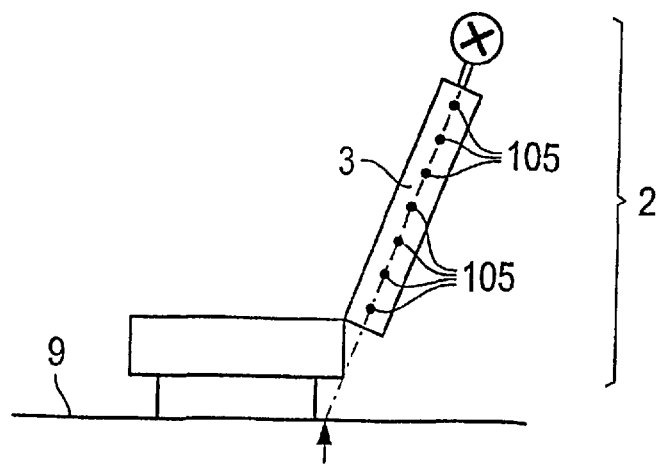
FIG. 5 shows a vehicle seat with markings applied to the side of its backrest.

FIG. 5 shows a vehicle seat 2 on whose backrest 3 punctual markings 105 are disposed in a straight line. By analyzing the position of the markings in the line and its point of intersection with the vehicle floor, the position of the vehicle seat 2 is uniquely assignable in relation to the vehicle floor 9. The advantageously obviates the need for costly mechanical measuring methods for determining the position of the vehicle seat.

What is claimed is:

1. A device for sensing an object in a vehicle for occupant detection, comprising:
   at least one optical marking which is provided on at least one element disposed on or in the vehicle;
   a camera being disposed in the vehicle and sensing the markings; and
   an evaluation unit connected downstream of the camera and determining a position of the markings,
   the evaluation unit determining the surface shape of the at least one element from the position of at least one marking and the predefined dimension of the element.

2. The device according to claim 1, wherein the camera acquires spatial information about the image area to be captured and is preferably implemented as a stereo camera with two image sensors whose optical axes are spaced a predefined distance apart.

3. The device according to claim 1, wherein the evaluation unit determines a position of an element in the vehicle interior from the position of the markings.

4. The device according to claim 1, wherein the element is moveable in relation to the vehicle.

5. The device according to claim 1, wherein the element is fixed in relation to the vehicle.

6. The device according to claim 1, wherein the element is implemented as at least one of a dashboard, a window and a lining of the vehicle roof, a vehicle floor, a vehicle seat, a backrest of the vehicle seat, a seat base of the vehicle seat, a child seat, a head restraint, an internal rear-view mirror, an external rear-view mirror, a seatbelt and a window glass.

7. The device according to claim 1, wherein the marking or markings are disposed on a side of the relevant element.

8. The device according to claim 7, wherein the evaluation unit determines a contour of the surface of the vehicle seat from the position of the marking or markings on the vehicle seat.

9. The device according to claim 1, wherein at least one of the markings has a predefined geometrical shape.

10. The device according to claim 1, wherein at least one of the markings is implemented punctually and/or lineally and/or areally.

11. The device according to claim 1, wherein at least one of the markings exhibits a characteristic shape which is at least one of a group of punctual, lineal and areal markings.

12. The device according to claim 1, wherein at least one of the markings is implemented as a reflector, where the reflector is one of a flat mirror, triple mirror or spherical mirror.

13. The device according to claim 1, wherein at least one of the markings is implemented as an opto-transmitter, where the opto-transmitter is one of an electroluminescence foil, LED, gas discharge lamp or laser diode.

14. The device according to claim 13, wherein the opto-transmitter is encoded by emission of a predefined signal sequence.

15. The device according to claim 14, wherein the signal sequence of the opto-transmitter includes digital signals which are synchronized with an image capture rate of the camera.

16. The device according to claim 1, wherein the camera is disposed on a lining of the vehicle roof.

17. The device according to claim 1, further comprising a light source which illuminates the image area to be captured the camera.

18. The device according to claim 17, wherein the light source is incorporated in the camera.

19. The device according to claim 1, wherein
   markings are disposed on the seat base and on the surface of the seat back,
   the markings are sensed by the camera, and
   the evaluation unit determines the occupancy of the vehicle seat depending on the covering of the markings.

20. The device according to claim 19, wherein the evaluation unit recognizes occupancy of the vehicle seat with a child seat and its position on the vehicle seat depending on the detected markings on the child seat.

21. The device according to claim 1, wherein the evaluation unit determines the spatial position of the elements.

22. The device according to claim 1, wherein the camera acquires gray-scale values of the image area to be captured.

23. A method for sensing an object in a vehicle for occupant detection, comprising:
   a camera detects at least one optical marking which is provided on at least one element which is disposed in or on the vehicle; and
   an evaluation unit connected downstream of the camera, which determines the position of at least one marking, wherein
   the evaluation unit determines a surface shape of the element from the position of at least one marking and the predefined dimension of the element.

24. The method according to claim 23, wherein
   the camera acquires spatial information of an image to be captured, and
   the evaluation unit connected downstream of the camera determines the position of at least one element from the spatial position of at least one marking.

25. The method according to claim 23, wherein
   the camera acquires gray-scale values of the image to be captured, and
   the gray-scale values of at least one marking sensed by the camera are different from the gray-scale values in the immediate vicinity of the marking, the gray-scale values of the detected marking being at least twice as bright as those in the immediate vicinity of the marking.

26. The method according to claim 23, wherein
   light from a light source in at least one of the vehicle and of the ambient lighting illuminates the image area to be captured,
   the marking reflects the light to the camera, and
   the reflected light is brighter than the light reflected from the area around the marking.

27. A device for sensing an object in a vehicle for occupant detection for adjusting an element, comprising:
   a camera to sense at least one marking on at least one of an interior rear-view mirror, exterior rear-view mirror and a head restraint; and
   an evaluation unit to determines the current adjustment position of the relevant rear-view mirror, wherein
   the evaluation unit detects a current position of an occupant's head and adjusts the relevant rear-view mirror or the head restraint according to the position of the head.

28. A device for sensing an object in a vehicle for occupant detection for protecting an object from becoming trapped in an adjustable window glass, comprising:

at least one marking disposed on at least one of an adjustable window glass and a marking incorporated in the window glass; and a position of the window glass is determined from the position of at least one marking.

29. The device according to claim 28, wherein an object in a vicinity of at least one of a hazard area and a hazard area between the window glass and a window frame enclosing the window glass is detected by the evaluation unit by at least one of the markings and/or part of the marking in question being covered by the object, the object being analyzed by the evaluation unit, the object being recognized by the image processing algorithm in the evaluation unit, and the closing operation of the window glass being controlled as a function of the position of the object and the position of a top edge of the window glass.

30. The device according to claim 29, wherein the object is one of an occupant's head, neck, arm, hand and/or fingers.

* * * * *